United States Patent [19]

Heinzl et al.

[11] 4,379,304

[45] Apr. 5, 1983

[54] SCREEN FOR A MOSAIC INK RECORDER

[75] Inventors: Joachim Heinzl, Munich; Erich Kattner, Neubiberg, both of Fed. Rep. of Germany

[73] Assignee: Siemens Aktiengesellschaft, Berlin & Munich, Fed. Rep. of Germany

[21] Appl. No.: 226,848

[22] Filed: Jan. 21, 1981

[30] Foreign Application Priority Data

Feb. 22, 1980 [DE] Fed. Rep. of Germany ....... 3006726

[51] Int. Cl.³ ............................................ G01D 15/18
[52] U.S. Cl. ............................................ 346/140 R
[58] Field of Search .................................... 346/140 R

[56] References Cited

U.S. PATENT DOCUMENTS

| | | | |
|---|---|---|---|
| 3,747,120 | 7/1973 | Stemme | 346/75 |
| 4,158,847 | 6/1979 | Heinzl et al. | 346/140 |
| 4,233,610 | 11/1980 | Fischbeck | 346/140 |

FOREIGN PATENT DOCUMENTS

| | | | |
|---|---|---|---|
| 2516797 | 10/1976 | Fed. Rep. of Germany | 346/140 |

OTHER PUBLICATIONS

Denny, C. M.; Nozzle Filter and Orifice Configuration for an Ink Jet Printer; IBM TDB, vol. 21, No. 11, Apr. 1979, pp 4590–4592.

Kendall et al.; Combined Nozzle and Filter Assembly and its Fabrication; IBM TDB, vol. 22, No. 8A, Jan. 1980, pp. 3441–3442.

*Primary Examiner*—Joseph W. Hartary
*Attorney, Agent, or Firm*—Hill, Van Santen, Steadman, Chiara & Simpson

[57] ABSTRACT

A mosaic ink recorder having a number of outlet nozzles in a nozzle plate for discharging ink droplets on a recording media has a screen with apertures therein which are disposed in groups in registry with the outlet nozzles, the apertures in the screen having a diameter which is substantially less than the diameter of the outlet nozzles. The apertures increase the pressure necessary to break the meniscus of the ink remaining in a channel after discharge of a droplet by a ratio approximately equal to the ratio of the diameter of the aperture to the diameter of the nozzle. The recording head is thus rendered substantially less sensitive to vibration and other disturbances which may otherwise break the meniscus and permit ink to flow in a channel at undesired times. The screen may be a separately attachable element or may be integrated with the body of the recording head.

6 Claims, 6 Drawing Figures

SCREEN FOR A MOSAIC INK RECORDER

BACKGROUND OF THE INVENTION

1. Field of the Invention

The present invention relates to mosaic ink recorders operated by piezoelectric drive elements, and in particular to a screen for such a recorder which renders the recorder substantially less sensitive to disturbances which would otherwise result in ink flow in the channels at undesired times.

2. Description of the Prior Art

A mosaic ink recorder having a recording head containing a number of ink channels which communicate an ink reservoir with a nozzle plate provided with a like number of outlet nozzles in registry with the ink channels, and having a piezoelectric drive element associated with each channel which is actuated to discharge ink from the respective channel is known from U.S. Pat. No. 4,158,847. The piezoelectric drive elements are tubular transducers which surround a portion of the ink channels. The ink channels are connected to an ink reservoir via a distributor and by selected operation of the piezoelectric elements a surge wave is produced in respective ink channels so that a droplet of ink is ejected from the respective outlet opening. During a suction phase of operation, ink is absorbed from the ink reservoir and at the same time a negative ink meniscus is produced at the outlet opening of the channel. Air is sucked in through the outlet opening as a result of the capillary action of the extremely small outlet opening. This blocking effect is desireable in that the ink which is trapped thereby in the ink channel blocks further flow of ink from the channel until the piezoelectric element is again actuated.

This blocking effect may be impaired, however, if the ink recorder is exposed to heavy vibration or other types of mechanical disturbances. Under these circumstances, air may be sucked in via the outlet opening and will considerably impair the printing process and may even render the process impossible.

Such an undesired effect may occur in ink recorders operating in accordance with the so-called under pressure process, either during a rest state or during pauses in the printing process. In such situations, that is, when ink is not being ejected through the nozzles, the ink remaining in the respective channels forms a negative meniscus in each of the outlet openings of the nozzle plate, and in the event of additional unchecked motion of the recording head this meniscus may extend inwards into the channel to such an extent that the blocking action of the outlet opening is overcome and unwanted ink flow occurs.

SUMMARY OF THE INVENTION

It an object of the present invention to provide a screen for a mosaic ink printing device which increases the blocking effect at the outlet end of the respective ink channels without influencing the size of droplets of ink ejected during the printing process.

The above object is inventively achieved in a mosaic ink printing device having a blocking screen disposed between the terminations of the ink channels and the outlet openings of the nozzle plate. The blocking screen has a plurality of grouped apertures disposed in the vicinity of each ink channel termination, with the apertures arranged in the group in symmetric fashion with respect to the shape of the outlet nozzle, and each aperture in the blocking screen having a smaller cross-section other than the outlet nozzle.

The use of such a blocking screen constructed in accordance with the principles of the present invention increases the blocking pressure, that is, that pressure at which the ink fluid breaks away at the inner end of the outlet opening of the nozzle plate, without influencing the size of the droplets of ink which are discharged or ejected during operation of the printing device. The ink recorder is thus rendered substantially less sensitive to vibration and other mechanical shock.

The blocking screen consists of a thin plate having apertures which are circular in shape or which may be in the shape of segments of a circle.

In a further embodiment of the invention, the nozzle plate and the blocking screen may be combined to form a single component which may be molded in a galvanoplastic manufacturing process. Combining the nozzle plate and the blocking screen into one element avoids the formation of an air gap which would be present, although which can be minimized, between a separately-formed blocking screen and nozzle plate.

DESCRIPTION OF THE PREFERRED EMBODIMENTS

Figure 1:
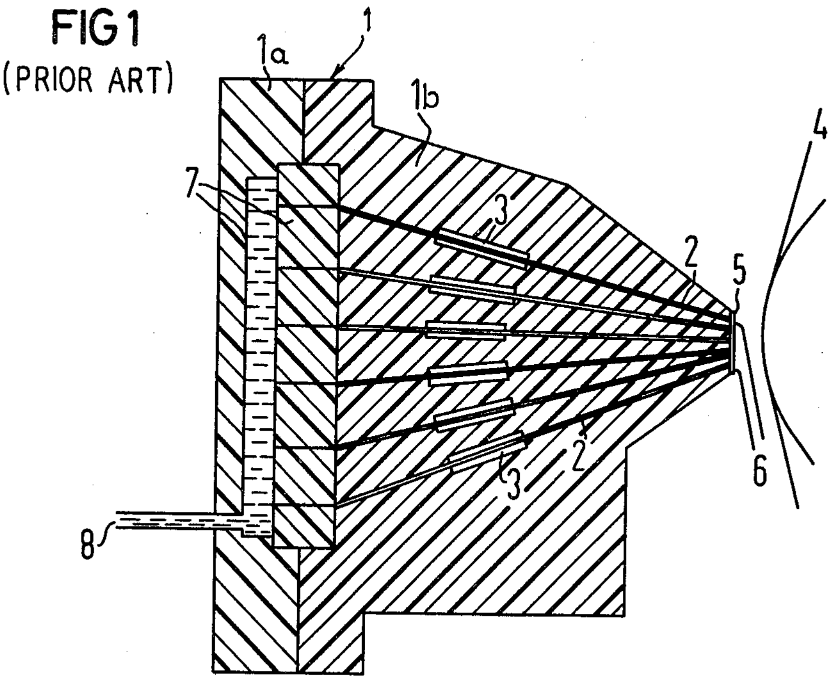
FIG 1 (PRIOR ART)
FIG. 1 is a side view in section of a known mosaic ink recording head of the type in which the present invention may be utilized.

A conventional ink mosaic recording head is shown in FIG. 1 of the type, for example, which is disclosed and claimed in U.S. Pat. No. 4,158,847. The recording head 1 consists of joined portions 1*a* and 1*b* and has six ink channels 2, each of which has an associated piezoelectric drive element in the form of a cylindrical tube 3 which encases a portion of the respective ink channels. The recording head 1 is positioned in front of a medium 4 which is to receive the ink from the recording head 1 in the form of printed characters. On the side of the recording head 1 facing the medium 4, the ink channels 2 terminate and are covered with a nozzle plate 5 having a like number of outlet openings 6 in registry with the terminations of the ink channels 2. At the opposite side of the recording head is a distributor means 7 which is connected via an inflow channel 8 to an ink reservoir (not shown). By selected operation of the piezoelectric drive elements 3, a surge wave is produced in particular ink channels 2 causing individual ink droplets to be discharged out of the outlet openings 6. A mosaic print pattern is thus produced on the recording medium 4, in front of which the recording head 1 is moved row by row by any suitable means known in the art. The operation of the recording head 1 is known to those skilled in the art and need not be described in further detail herein.

The discharge or printing process is, in each instance, preceded by a suction phase during which ink is transferred from the reservoir to the distributor means 7 via the inflow channel 8. The ink is simultaneously sucked inwards in each outlet opening 6, and under normal operating conditions as a result of the influence of the surface tension of the ink together with the extremely narrow outlet openings, the capillary effect prevents the ink remaining in the channels from breaking away at the inner edge of the outlet openings 6 in the nozzle plate 5 so that an inflow of air through the channels 2 is avoided. Under some conditions, for example, in the case of mechanical vibrations, this blocking action is not always adequate and controllable. The vibrations may break the "seal" of ink in the channel 2 thus permitting air to be sucked through the channels 2 during the suction phase of operation.

In order to prevent or substantially minimize breaking of the ink "seal" a blocking screen is provided in accordance with the principles of the present invention which has a number of groups of apertures disposed in registry with the terminations of the channels 2 and the outlet openings in the nozzle plate 5. In each of the embodiments shown in FIGS. 2 and 3, the blocking screen is in the form of a thin plate 9 which is disposed between the portion of the recording head 1*b* and the nozzle plate 5. The blocking screen may also be manufactured by a galvano-plastic molding process as a part of the nozzle plate 5, as shown in FIG. 4. If the blocking screen takes the form of a thin plate 9, the plate is clamped between the nozzle plate and the recording head by any known suitable means and is fixed in position by means of locating pins (not shown).

Figure 2A:
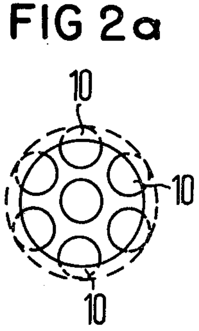
FIG. 2*a*is a detailed view of the apertures in the blocking screen shown in FIG. 2.
Figure 2:
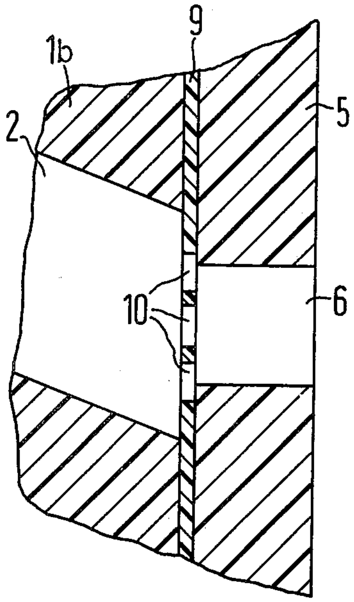
FIG. 2 is an enlarged sectional view of a portion of a blocking screen for the recording head shown in FIG. 1 constructed in accordance with the principles of the present invention.

In the embodiment shown in FIG. 2, the plate 9 forming the blocking screen has a number of groups of apertures 10 disposed in registry with the outlet openings 6 and the terminations of the channels 2 which apertures 10 are in the shape of circles and are arranged in symmetric fashion with respect to a center axis of the outlet opening 6. In the embodiment shown in FIG. 3, the blocking screen is in the form of a thin plate 9 having apertures 11, one of which is a centrally disposed circular aperture and the remainder of which are segments of a circle symmetrically surrounding the center circular aperture. Again, the apertures 11 are arranged symmetrically with respect to a central axis of the outlet opening 6.

The manner of operation of the blocking screen in all embodiments is as follows. With increasing under pressure of the ink, the ink is increasingly drawn inwards into the outlet opening 6, that is, the negative meniscus of the ink surface becomes increasingly greater. If the blocking action of the outlet opening 6 is now overcome, the ink flows to the blocking screen 9. The apertures 10 in FIG. 2 or 11 in FIG. 3 of the blocking screen 9 produce a sudden increase in blocking pressure. If, for example, the outlet opening 6 has a diameter of 80$\mu$ and the openings 10 or 11 of the blocking screen 9 have a diameter of 30$\mu$, the blocking pressure is increased approximately 3-fold as soon as the air which has penetrated through the outlet opening 6 reaches the blocking screen. Even if the blocking pressure of the blocking screen is overcome, the blocking pressure again falls while the incoming volume of air substantially increases, thereby forming another negative ink meniscus at the inner edge of the blocking screen 9. Thus, even in this extremely unfavorable situation the ink "seal" does not break and instead a volume of air builds in the ink channel having a magnitude which is such that even high pressure impulses, such as may occur as a result of vibrations, are dissipated before the air bubble breaks away in front of the opening so that the ink remains in the ink channel 2.

If a further pressure increase occurs in the ink channel 2, the ink is forced through the openings of the blocking screen 9 and through the outlet opening 6 of the nozzle plate 5, whereby the pressure increases until the radius of curvature of the ink meniscus is equal to one half the diameter of the outlet opening. If this blocking pressure is overcome, a rapid increase in the volume of ink is accompanied by a further drop in pressure.

Figure 3:
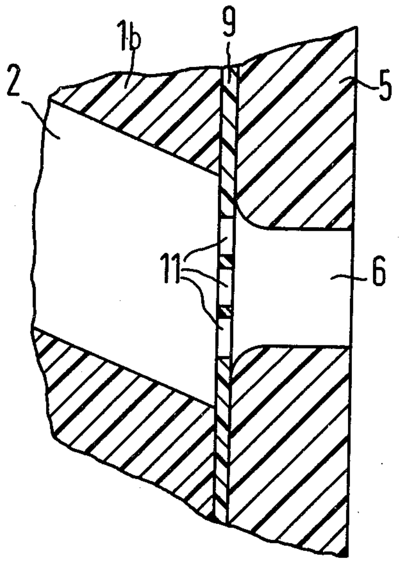
FIG. 3 is a second embodiment of a blocking screen constructed in accordance with the principles of the present invention.
Figure 3A:
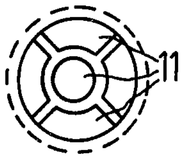
FIG. 3*a* is a detailed view of the apertures in the blocking screen shown in FIG. 3.
Figure 4:
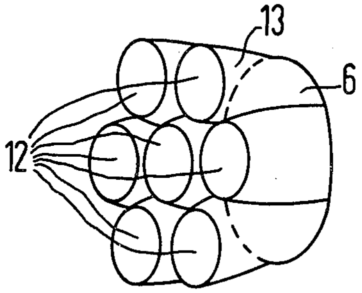
FIG. 4 is a perspective view of a nozzle opening and blocking screen apertures in an embodiment of the invention wherein the nozzle plate and blocking screen are combined in a signle component.

Although the embodiments of the blocking screen shown in FIGS. 2 and 3 wherein the blocking screen is in the form of a thin plate 9 which is inserted between the recording head 1 and the nozzle plate 5 are easy to manufacture, a small air gap on each side of the plate 9 between the recording head and the nozzle plate can not always be avoided due to the extremely small working dimensions. In a further embodiment of the invention, the blocking screen and nozzle plate are molded in a single unit as shown in FIG. 4. FIG. 4 shows one nozzle outlet 6 and an associated number of apertures 12 which are molded in a single component 13. In the exemplary embodiment of FIG. 4, there are seven apertures 12 for each outlet opening 6. It will be understood that other outlet openings 6 in the nozzle plate 5 which are not shown each have an identical construction.

Although modifications and changes may be suggested by those skilled in the art it is the intention of the inventors to embody within the patent warranted hereon all changes and modifications as reasonably and properly come within the scope of their contribution to the art.

We claim as our invention:

1. In a mosaic ink recorder having a recording head with a plurality of ink channels disposed therein, said ink channels having respective terminations covered with a nozzle plate, said nozzle plate having a plurality of outlet openings in registry with the terminations of the ink channels, and each ink channel having a piezoelectric drive element selectively actuatable for discharging ink droplets from a respective channel, the improvement of:

a blocking screen disposed between the terminations of the ink channels and the nozzle plate, said blocking screen having a plurality of groups of apertures, each group of apertures being disposed in registry with a respective channel termination and a respective outlet opening, each group of said apertures consisting of a plurality of apertures disposed in symmetrical fashion around a center aperture, said center aperture being centered with respect to a central axis of an outlet opening and said apertures having a cross-section which is approximately one-third of a cross-section of said outlet openings, said apertures being of a size for maintaining an ink seal of the respective ink channels after discharge of an ink droplet therefrom for preventing entry of air into said ink channel.

2. The improvement of claim 1 wherein said blocking screen is a plate disposed between said nozzle plate and said recording head.

3. The improvement of claim 2 wherein said apertures have a circular cross-section.

4. The improvement of claim 2 wherein said center aperture in each of said group of apertures has a circular cross-section and a remainder of the apertures in each group of apertures have a cross-section in the shape of a segment of a circle and are symmetrically disposed around said circular aperture.

5. The improvement of claim wherein said blocking screen and said nozzle plate are integrally formed in a single unit.

6. The improvement of claim 5 wherein said unit is molded by a galvano-plastic molding process.

* * * * *